(12) United States Patent
Caballero et al.

(10) Patent No.: US 11,589,430 B2
(45) Date of Patent: Feb. 21, 2023

(54) INDUCTION HEATING DEVICE

(71) Applicant: Aktiebolaget SKF

(72) Inventors: Alberto Javier Herrera Caballero, Utrecht (NL); Jens Kammann, Bunde (DE)

(73) Assignee: Aktiebolaget SKF, Gothenburg (SE)

( * ) Notice: Subject to any disclaimer, the term of this patent is extended or adjusted under 35 U.S.C. 154(b) by 537 days.

(21) Appl. No.: 16/706,050

(22) Filed: Dec. 6, 2019

(65) Prior Publication Data
US 2020/0196401 A1 Jun. 18, 2020

(30) Foreign Application Priority Data
Dec. 18, 2018 (DE) .......................... 102018222168.5

(51) Int. Cl.
*H05B 6/10* (2006.01)
*H05B 6/06* (2006.01)

(52) U.S. Cl.
CPC ............... *H05B 6/102* (2013.01); *H05B 6/06* (2013.01)

(58) Field of Classification Search
CPC . H05B 6/102; C21D 9/40; C21D 9/32; C21D 1/10; C21D 1/42
USPC ............... 219/635, 660, 647, 661, 640, 652; 266/129
See application file for complete search history.

(56) References Cited

U.S. PATENT DOCUMENTS 9,012,819 B2 * 4/2015 David ...................... C21D 1/42
219/661
2018/0177002 A1 * 6/2018 Herrera Caballero ... H05B 6/14

FOREIGN PATENT DOCUMENTS

EP 2728965 A1 5/2014

* cited by examiner

*Primary Examiner* — Tu B Hoang
*Assistant Examiner* — Thomas J Ward
(74) *Attorney, Agent, or Firm* — Garcia-Zamor Intellectual Property Law; Ruy Garcia-Zamor; Bryan Peckjian

(57) ABSTRACT

An induction heating device having a control box, a magnetic core provided with at least one inductor fed with a current by a power electronics that is controlled by a control circuit, the power electronics and the control circuit being disposed in the control box, a removeable closing yoke for completing the magnetic circuit of the magnetic core, and a plurality of temperature sensors. A plurality of metal articles are simultaneously heated so as to each reach a target temperature and according to a heating cycle during which the temperatures sensors monitor the temperatures of the plurality of the metal articles so that each metal article is connected to a temperature sensor that is not connected to any other metal article.

9 Claims, 3 Drawing Sheets

INDUCTION HEATING DEVICE

CROSS-REFERENCE TO RELATED APPLICATIONS

This application claims priority to German patent application no. 102018222168.5 filed on Dec. 18, 2018, the contents of which are fully incorporated herein by reference.

TECHNOLOGICAL FIELD

The present invention concerns a device comprising an induction coil for heating a metal article such as a rolling element bearing, a ring or a gear, by inducing eddy currents in the metal article.

BACKGROUND OF THE INVENTION

EP 2728965A1 describes a known type of bearing induction heater for which two temperature probes are used during the heating of a bearing according to a heating cycle. One temperature probe monitors the temperature of the inner ring of the bearing and the other temperature probe monitors the temperature of the outer ring of the bearing. The difference between the two temperatures triggers a switchover between a first portion of the heating cycle and a second portion of the heating cycle.

Generally speaking, it is known to use induction heaters with a single induction coil or with several induction coils. Improvements are still possible.

SUMMARY OF THE INVENTION

It is a particular object of the present invention to provide an induction heating device for heating up a metal article.

According to the invention, the induction heating device comprises a control box, and a magnetic core which is provided with at least one inductor which is fed with a current by a power electronics which is controlled by a control circuit. The power electronics and the control circuit are installed in the control box.

The device also comprises a removeable closing yoke for completing the magnetic circuit of the magnetic core, and a plurality of temperature sensors.

Still according to the invention, a plurality of metal articles are simultaneously heated so as to each reach a target temperature and according to a heating cycle during which the temperatures sensors monitor the temperatures of the plurality of the metal articles so that each metal article is connected to a temperature sensor which is not connected to any other metal article.

According to other aspects of the invention which are advantageous but not compulsory, such an induction heating device may incorporate one or several of the following features:

there are as many temperature sensors as there are different articles to be heated simultaneously;

the magnetic core has a first arm, a second arm and a third arm, the arms forming an integral U or C shaped core section, and the closing yoke is positioned across the open arms of the U or C shaped core section to complete the magnetic circuit of the magnetic core;

the heating device comprises a single inductor installed on one of the arms of the U or C shaped magnetic core;

the heating device comprises two inductors, one inductor is installed on one of the two open arms of the U or C shaped magnetic core and the other inductor is installed on the other open arm.

It is another aspect of the invention to provide a method to heat up several metal articles with an induction heating device according to the invention, the method comprising the following steps:

the metal articles are placed around any of the arms of the magnetic core or the closing yoke;

for each metal article, a unique temperature sensor is connected to it;

the target temperature to be reached for each metal article is set for each temperature sensor;

the heating cycle is started, for instance by a manual action consisting of pressing a button;

the several metal articles are heated up simultaneously.

According to other aspects of the invention which are advantageous but not compulsory, such a method may incorporate one or several of the following features:

it further comprises the following step:

d) for each target temperature, a first temperature alarm value and a second temperature alarm value are set, the first temperature alarm being used to prevent an overheating of the associated metal article, and the second temperature alarm value being used to prevent an underheating of said associated metal article;

during step f) at least some of the metal articles might be placed in contact with each other, so as to ease the transfer of heat between them;

during step c), the target temperatures of all metal articles to be heated simultaneously are set to the same value or to different values.

Thanks to the invention, it is possible to heat simultaneously several metal articles, and not necessarily at the same pace, which can be useful in order to speed up the assembly of systems comprising several metal articles, or to save downtime during the maintenance of several metal articles on the same system or several systems located in the same vicinity.

Thanks to the invention, it is possible to heat simultaneously several metal articles so as to bring them each to a desired temperature, and the desired temperatures can be different or the same.

Also, thanks to the invention, it is possible to use a minimum quantity of temperature probes for monitoring directly the temperature of each metal article during the heating of several metal article.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
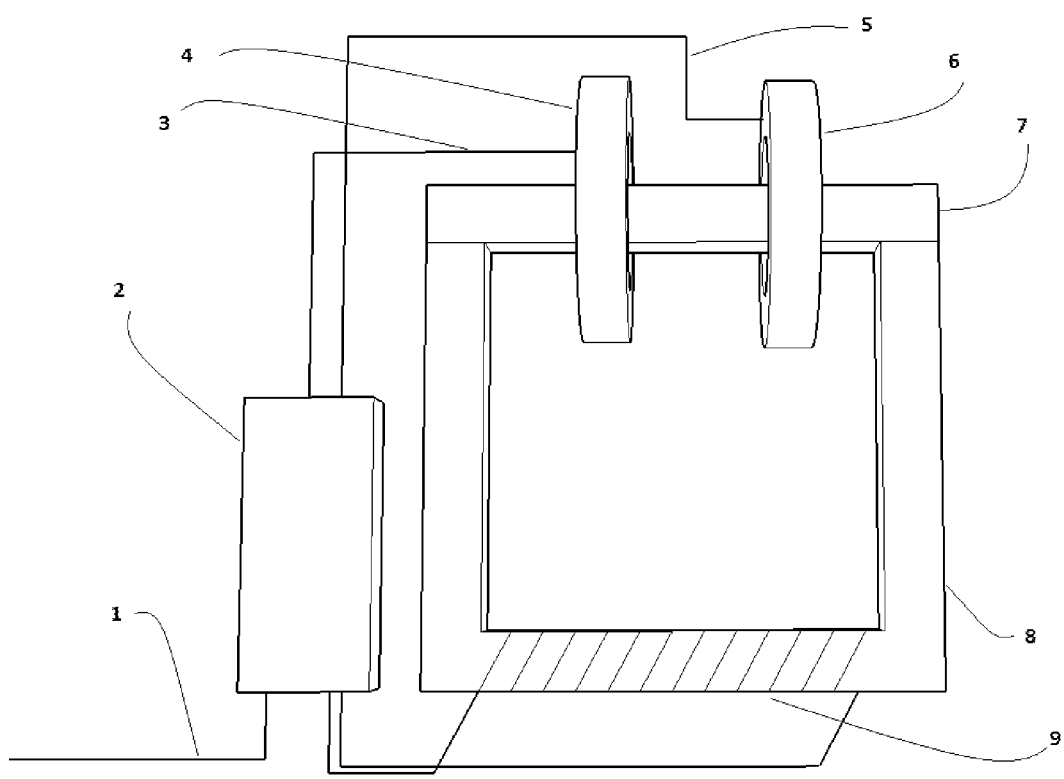
FIG. 1 shows a first preferred embodiment of an induction heating device according to the invention with two metal articles to be heated in a first relative position with respect to each other.

FIG. 1 illustrates an induction heating device connected to a power supply 1 which supplies electric power to a control box 2 which forms part of the device. The induction heating device also comprises a magnetic core 8 provided with an inductor or coil 9.

Preferably, the magnetic core 8 is ferromagnetic.

The magnetic core 8 has a first arm, a second arm and a third arm, the arms forming an integral U or C shaped core section, and a fourth arm or closing yoke 7 which is positioned across the open arms of the U or C shaped core section to complete the magnetic circuit of the magnetic core 8. The closing yoke 7 is moveable to allow for a first 4 and a second 6 metal articles to be arranged for heating. The inductor 9 is installed on one of the arms of the U or C shaped magnetic core 8.

The inductor 9 is fed with a current by a power electronics which is controlled by a control circuit. The power electronics and the control circuit are installed in the control box 2.

Still according to FIG. 1, the induction heating device further comprises a first 3 and a second 5 temperature sensors. Both temperature sensors are connected to the control box 2. Preferably, the temperature sensors are each provided with a magnetic thermocouple. Furthermore, the first temperature sensor 3 is connected to the first metal article 4, and the second temperature sensor 5 is connected to the second metal article 6.

As illustrated on FIG. 1, the two metal articles are located at a certain distance from each other. This is advantageous when for instance it is desired to heat up the two articles at two different temperatures.

Figure 2:
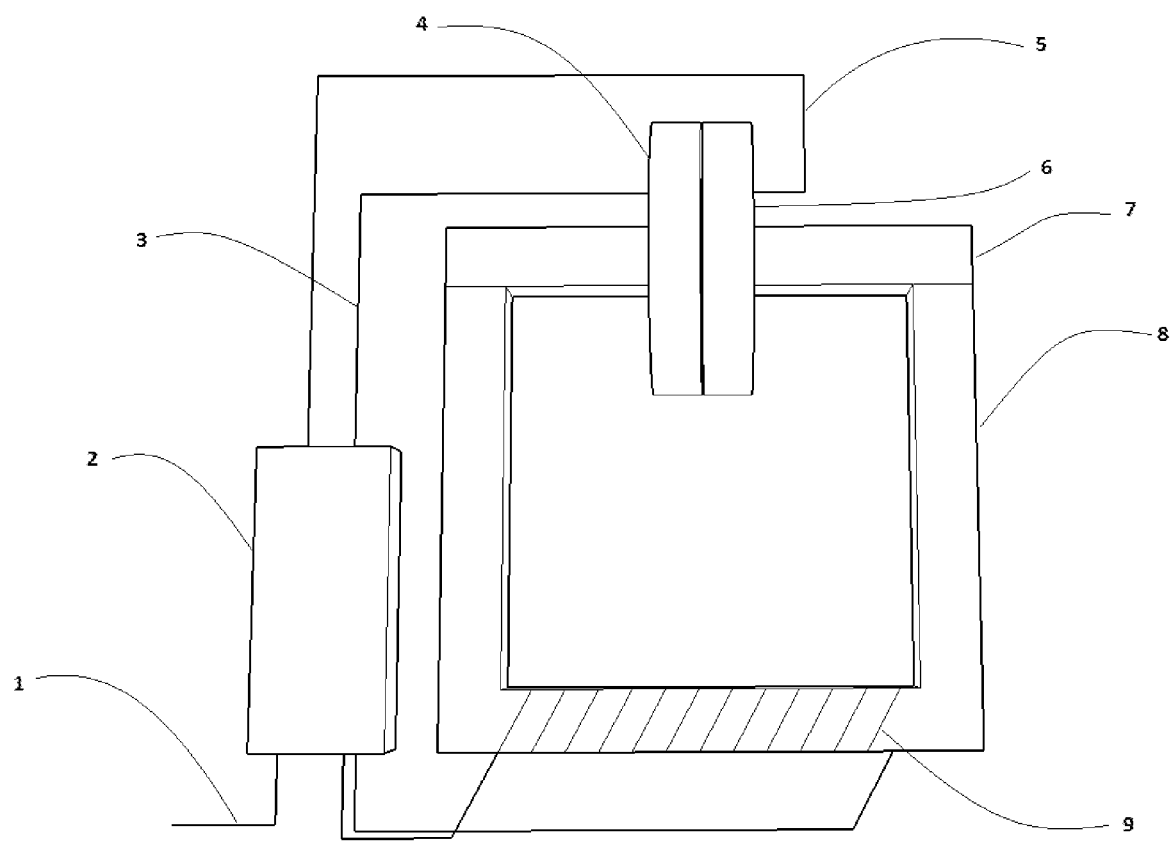
FIG. 2 shows the induction heating device of FIG. 1 with the two metal articles in a second relative position with respect to each other.

FIG. 2 illustrates the same induction heating device as the one of FIG. 1, but with two metal articles 4, 6 which are in another relative position with respect to each other. More precisely, the two metal articles are in contact with each other. This allows for an efficient transfer of heat between the two articles, for instance from one article to the other, during the heating cycle. Advantageously, the two metal articles are in contact with each other by means of two surfaces as large as possible. As illustrated on FIG. 2, the two metal articles are in contact according to two flat side surfaces.

Advantageously, the two metal articles may be kept in contact with each other temporarily during the heating cycle thanks to a holder (not illustrated).

Figure 3:
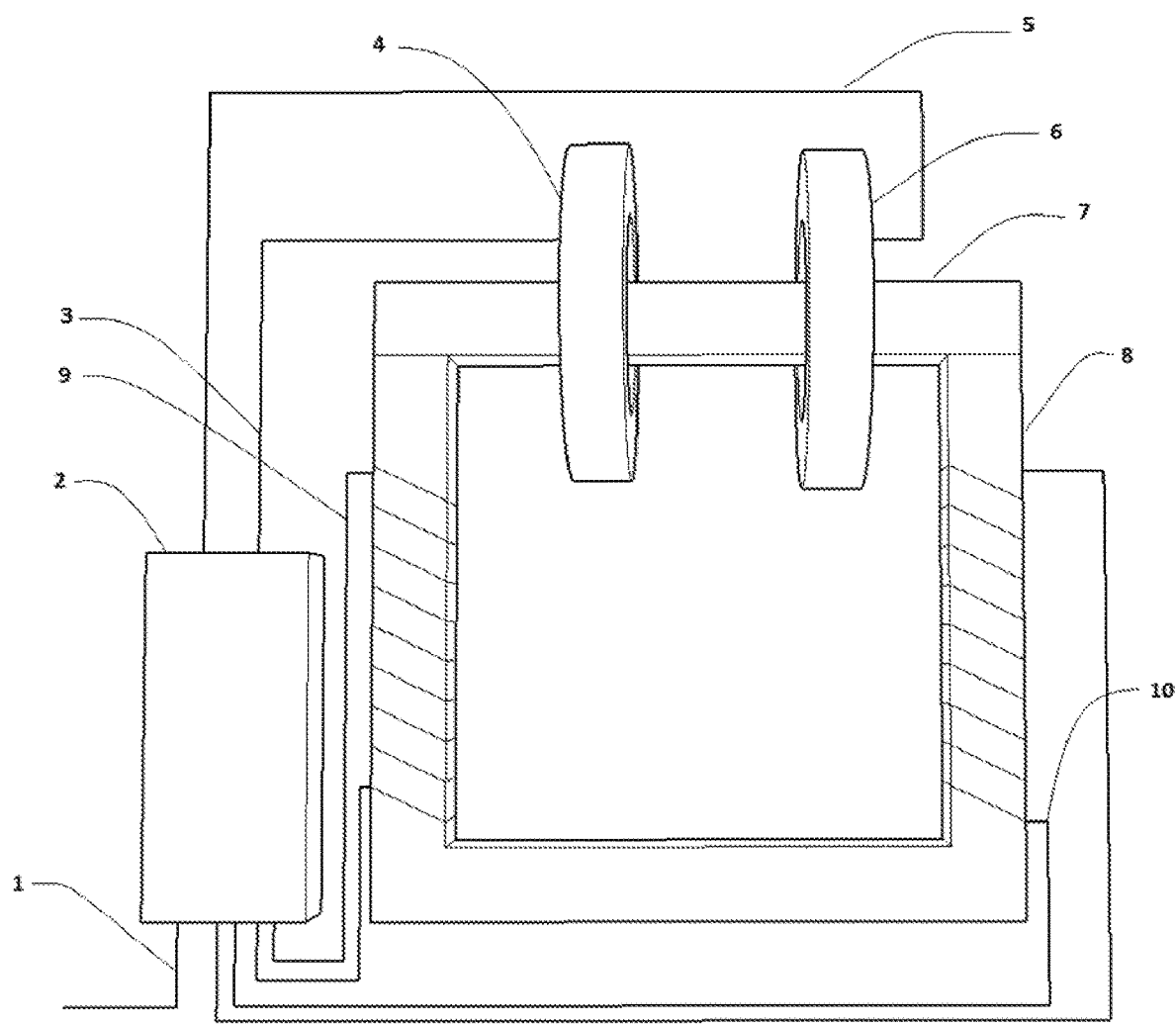
FIG. 3 shows a second preferred embodiment of an induction heating device according to the invention.

FIG. 3 illustrates a second preferred embodiment of an induction heating device. For the sake of clarity, the same elements bare the same reference numbers as for the embodiment illustrated on FIGS. 1 and 2.

The second embodiment of FIG. 3 differs from the first embodiment in that it comprises a second inductor 10. The first inductor 9 is installed on one of the two open arms of the U or C shaped magnetic core, whereas the second inductor 10 is installed on the other open arm of the U or C shaped magnetic core.

The metal articles can be a rolling element bearings, rings or gears.

In a non-illustrated embodiment of the invention, at least three metal articles are positioned around the closing yoke 7.

In a non-illustrated embodiment of the invention, the induction heating device comprises at least three temperature sensors.

During a heating cycle performed by the induction heating device, each metal article is connected to a temperature sensor which is not connected to any other metal article. The temperature sensor monitors the temperature of the article to which it is connected.

The metal articles are heated simultaneously during a heating cycle.

In a preferred embodiment of the invention, the induction heating device comprises as many temperature sensors as the number of metal articles to be heated up simultaneously, and each temperature sensor is connected to a unique metal article.

During one heating cycle, the several metal articles are each heated up until reaching a target temperature.

Preferably, the induction heating device continuously monitors the temperature readings during a heating cycle.

Preferably, a first temperature alarm value is set for each temperature monitoring, so as to avoid an overheating of the corresponding metal article. Indeed, it has been observed that when metal articles of different sizes and/or weights are heated up simultaneously, they heat up at different paces and some reach their first alarm temperature before others.

Also, preferably, a second temperature alarm value is set for each temperature monitoring, so as to avoid an underheating of the corresponding metal article.

The heating cycle used to heat simultaneously several metal components is controlled by the control box.

For a given set of hardware, the heating cycle is self-adaptive, and depends on the target values, the first and second temperature alarm values, and of course the metal articles themselves (mass, volume, constituting materials, . . . ).

Each heating cycle comprises several portions which are set by the control box.

In a preferred embodiment of the invention, the heating cycle consists of a first portion of a first determined duration and with a high heating rate thanks to the sending of a high current or high currents in the inductor or inductors if the heating device is equipped with several inductors, and then a second portion of a second determined duration and with a lower heating rate thanks to the sending of a lower current or lower currents in the inductor or inductors.

In another preferred embodiment of the invention, the heating cycle comprises a third portion during which no current is sent to the inductor or inductors and for a third determined duration. This third portion can for instance occur during the first and second portions mentioned earlier.

In another preferred embodiment of the invention, the heating cycle comprises a fourth portion during which the current or currents are sent through the inductor or inductors so as to maintain the different metal articles each at the same temperature.

We will now describe the method of heating up simultaneously several metal articles with an induction heating device according to the invention. The method comprises the following steps:

the metal articles are placed around any of the arms of the magnetic core 8 or on the closing yoke 7. If it is desired to reach the same target temperature for some or all the metal articles, then these metal articles might be positioned in contact with each other, so as to ease the heat transfer between the metal articles and to help equalizing their temperatures.

b) for each metal article, a unique temperature sensor is connected to it, for instance by surface contact.

c), the target temperature to be reached for each metal article is set for each temperature sensor.

d) the first temperature alarm value and second temperature alarm value for each temperature monitoring are set for each temperature sensor.

This step d) is optional. Indeed, in a preferred embodiment of the invention, some values are set by default in the memory of the control box. For instance, the first alarm value is set to the target temperature +5° C., and the second alarm value is set to the target temperature −5° C.

Optionally, these first and second temperature alarm values can be set manually by an operator.

e) the heating cycle is started, for instance by a manual action consisting of pressing a button.

f) the several metal articles are heated up simultaneously. During this step, the metal articles are not heated up necessarily at the same pace. During this heating process, the induction heating device runs a heating cycle which comprises one or several portions among which one of the four ones described earlier. Advantageously, the last portion of the heating cycle is the fourth portion described earlier, so that the articles are each kept at their desired warm temperature until an operator is ready to remove the articles.

In a preferred embodiment of the invention, the target temperatures of all metal articles to be heated simultaneously are set to the same value. In this case, an induction heating device comprising only one inductor, such as the one of FIG. 1 and FIG. 2, may suffice to heat all articles simultaneously and in a reasonable time.

In another preferred embodiment of the invention, the target temperatures of all metal articles to be heated simultaneously are set to different values. In this case, an induction heating device comprising at least two inductors, such as the one of FIG. 3, may be needed.

In another preferred embodiment of the invention, for all metal articles to be heated simultaneously, the first temperature alarm values are set to the same value.

In another preferred embodiment of the invention, for all metal articles to be heated simultaneously, the second temperature alarm values are set to the same value. In another preferred embodiment of the invention, for all metal articles to be heated simultaneously, the first temperature alarm values are set to different values.

In another preferred embodiment of the invention, for all metal articles to be heated simultaneously, the first temperature alarm values are set to different values.

Thanks to the invention, it is possible to heat simultaneously several metal articles, which can be useful in order to speed up the assembly of systems comprising several metal articles, or to save downtime during the maintenance of several metal articles on the same system or several systems located in the same vicinity.

Thanks to the invention, it is possible to heat simultaneously several metal articles so as to bring them each to a desired temperature, and the desired temperatures can be different or the same.

Also, thanks to the invention, it is possible to use a minimum quantity of temperature probes for monitoring directly the temperature of each metal article during the heating of several metal article.

The invention claimed is:

1. An induction heating device comprising:
    a control box,
    a magnetic core provided with at least one inductor fed with a current by a power electronics that is controlled by a control circuit, the power electronics and the control circuit being disposed in the control box, the magnetic core having a first arm, a second arm and a third arm, the arms forming an integral U or C shaped core section, the first arm having a first central axis extending the length of the first arm, the second arm having a second central axis extending the length of the second arm, and the third arm having a third central axis extending the length of the third arm,
    a removeable closing yoke for completing a magnetic circuit of the magnetic core, the removeable closing yoke having a fourth central axis extending the length of the yoke, the removeable closing yoke being positioned across the open arms of the U or C shaped core section to complete the magnetic circuit of the magnetic core, and
    a plurality of temperature sensors, wherein
    a plurality of metal articles are simultaneously heated so as to each reach a target temperature and according to a heating cycle during which the temperature sensors monitor the temperatures of the plurality of the metal articles so that each metal article is connected to a temperature sensor that is not connected to any other metal article, and wherein
    each of the plurality of metal articles are axially spaced from each other along any of the first, second, third, and fourth central axes when the metal articles are heated.

2. The induction heating device according to claim 1, wherein there are as many temperature sensors as there are different articles to be heated simultaneously.

3. The induction heating device according to claim 1, further comprises a single inductor installed on one of the arms of the U or C magnetic core.

4. The induction heating device according to claim 1, further comprises two inductors, one inductor being installed on one of the two open arms of the U or C shaped magnetic core, and the other inductor being installed on the other open arm.

5. A method to heat up several metal articles with an induction heating device, the method comprising the following steps:
    providing an induction heating device having:
        a control box,
        a magnetic core provided with at least one inductor fed with a current by a power electronics that is controlled by a control circuit, the power electronics and the control circuit being disposed in the control box, the magnetic core having a first arm, a second arm and a third arm, the arms forming an integral U or C shaped core section, the first arm having a first central axis extending the length of the first arm, the second arm having a second central axis extending the length of the second arm, and the third arm having a third central axis extending the length of the third arm,
        a removeable closing yoke for completing a magnetic circuit of the magnetic core, and a plurality of temperature sensors, the removeable closing yoke having a fourth central axis extending the length of the yoke, the removeable closing yoke being positioned across the open arms of the U or C shaped core section to complete the magnetic circuit of the magnetic core, wherein
        a plurality of metal articles are simultaneously heated so as to each reach a target temperature and according to a heating cycle during which the temperature sensors monitor the temperatures of the plurality of the metal articles so that each metal article is connected to a temperature sensor that is not connected to any other metal article the method further comprising the steps of:
    a. placing each of the plurality metal articles around any of the arms of the magnetic core or the closing yoke, each of the plurality of metal articles being axially spaced from each other along any of the first, second, third, and fourth central axes;

b. connecting a unique temperature sensor to each metal article,
c. setting for each temperature sensor the target temperature to be reached for each metal article;
e. starting the heating cycle by a manual action consisting of pressing a button;
f. heating up each of the several metal articles simultaneously.

6. The method according to claim 5, further comprising the following step:
   d. setting a first temperature alarm value and a second temperature alarm value for each target temperature, the first temperature alarm being used to prevent an overheating of the associated metal article, and the second temperature alarm value being used to prevent an underheating of the associated metal article.

7. The method according to claim 5, wherein during step f) at least some of the metal articles placed in contact with each other, so as to ease the transfer of heat between them.

8. The method according to claim 5, wherein during step c), the target temperatures of all metal articles to be heated simultaneously are set to the same value.

9. The method according to claim 5, wherein during step c), the target temperatures of all metal articles to be heated simultaneously are set to different values.

* * * * *